United States Patent
Huang et al.

(10) Patent No.: US 10,497,168 B2
(45) Date of Patent: Dec. 3, 2019

(54) CLOUD GENERATION OF CONTENT TO BE STREAMED TO VR/AR PLATFORMS USING A VIRTUAL VIEW BROADCASTER

(71) Applicant: Nvidia Corporation, Santa Clara, CA (US)

(72) Inventors: Jen-Hsun Huang, Santa Clara, CA (US); Rev Lebaredian, Santa Clara, CA (US); Chad Vivoli, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 101 days.

(21) Appl. No.: 15/862,376

(22) Filed: Jan. 4, 2018

(65) Prior Publication Data
US 2018/0192081 A1    Jul. 5, 2018

Related U.S. Application Data

(60) Provisional application No. 62/442,366, filed on Jan. 4, 2017.

(51) Int. Cl.
*G06T 3/00* (2006.01)
*G06T 15/06* (2011.01)
(Continued)

(52) U.S. Cl.
CPC ............ *G06T 15/06* (2013.01); *A63F 13/212* (2014.09); *A63F 13/335* (2014.09); *A63F 13/355* (2014.09); *G06F 3/011* (2013.01); *G06T 15/20* (2013.01); *G06T 19/003* (2013.01); *H04N 13/117* (2018.05); *H04N 13/161* (2018.05); *H04N 13/243* (2018.05); *H04N 13/257* (2018.05); *H04N 13/261* (2018.05);
(Continued)

(58) Field of Classification Search
CPC .............. A63F 13/355; A63F 2300/538; A63F 2300/66; G06F 3/011; G06T 15/06; G06T 15/20; G06T 15/405; G06T 3/0087; H04N 13/117; H04N 13/161; H04N 13/239; H04N 13/261; H04N 13/271; H04N 13/275; H04N 13/279; H04N 13/344; H04N 13/351; H04N 2013/0081
See application file for complete search history.

(56) References Cited

U.S. PATENT DOCUMENTS

| 5,995,742 A | 11/1999 | Jannson et al. |
| 7,009,615 B1 | 3/2006 | Kilgard et al. |

(Continued)

OTHER PUBLICATIONS

Stone, et al.; "Immersive Molecular Visualization with Omnidirectional Stereoscopic Ray Tracing and Remote Rendering"; IEEE Int Symp Parallel Distrib Process Workshops Phd Forum; May 2016; Published online Aug. 4, 2016; 25 pgs.

*Primary Examiner* — Lawrence S Galka

(57) ABSTRACT

The disclosure provides a virtual view broadcaster, a virtual view broadcasting system, and a video gaming broadcaster. In one embodiment, the virtual view broadcaster includes: (1) a cloud-based renderer configured to generate virtual view images from a virtual camera positioned in a computer application, and (2) an image processor configured to generate a virtual view stream for the virtual camera employing the virtual view rendered images, wherein the virtual view images are from different viewing directions at the virtual camera.

19 Claims, 4 Drawing Sheets

(51) Int. Cl.

| | | |
|---|---|---|
| *H04N 13/161* | (2018.01) | |
| *H04N 13/243* | (2018.01) | |
| *H04N 13/257* | (2018.01) | |
| *H04N 13/261* | (2018.01) | |
| *A63F 13/212* | (2014.01) | |
| *A63F 13/335* | (2014.01) | |
| *G06F 3/01* | (2006.01) | |
| *G06T 15/20* | (2011.01) | |
| *G06T 19/00* | (2011.01) | |
| *H04N 21/2187* | (2011.01) | |
| *H04N 21/218* | (2011.01) | |
| *H04N 21/6587* | (2011.01) | |
| *H04N 21/81* | (2011.01) | |
| *A63F 13/355* | (2014.01) | |
| *H04N 13/344* | (2018.01) | |
| *H04N 13/279* | (2018.01) | |
| *H04N 13/275* | (2018.01) | |
| *H04N 13/117* | (2018.01) | |
| *H04N 13/271* | (2018.01) | |

(52) U.S. Cl.
CPC ......... *H04N 13/275* (2018.05); *H04N 13/279* (2018.05); *H04N 13/344* (2018.05); *H04N 21/2187* (2013.01); *H04N 21/21805* (2013.01); *H04N 21/6587* (2013.01); *H04N 21/816* (2013.01); *A63F 2300/538* (2013.01); *A63F 2300/66* (2013.01); *H04N 13/271* (2018.05)

(56) References Cited

U.S. PATENT DOCUMENTS

| | | | |
|---|---|---|---|
| 2004/0222988 A1 | 11/2004 | Donnelly | |
| 2008/0106549 A1 | 5/2008 | Newhall, Jr. et al. | |
| 2013/0063549 A1 | 3/2013 | Schnyder et al. | |
| 2013/0100132 A1* | 4/2013 | Katayama | H04N 13/275 345/420 |
| 2014/0038708 A1 | 2/2014 | Davison et al. | |
| 2014/0113718 A1* | 4/2014 | Norman | A63F 13/12 463/31 |
| 2015/0055937 A1 | 2/2015 | Van Hoff et al. | |
| 2016/0353090 A1* | 12/2016 | Esteban | G02B 27/0172 |
| 2016/0361658 A1* | 12/2016 | Osman | A63F 13/86 |
| 2017/0104927 A1* | 4/2017 | Mugavero | H04N 13/332 |
| 2017/0324951 A1* | 11/2017 | Raveendran | H04N 19/597 |
| 2018/0005447 A1* | 1/2018 | Wallner | G06T 15/205 |
| 2018/0007339 A1* | 1/2018 | Castleman | H04L 65/4069 |
| 2018/0096453 A1* | 4/2018 | Edwards | H04N 13/122 |
| 2018/0190007 A1* | 7/2018 | Panteleev | A63F 13/212 |

* cited by examiner

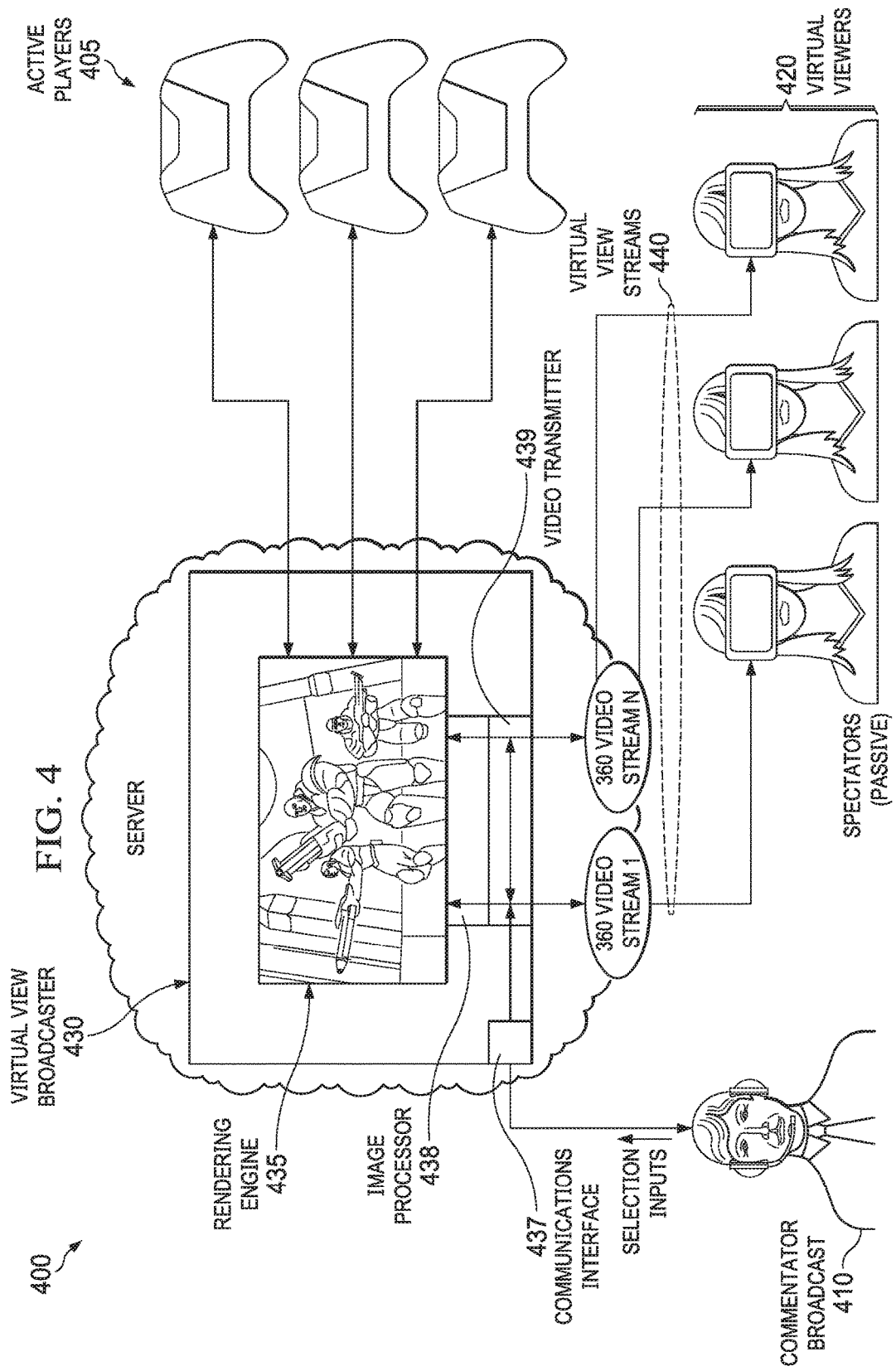

CLOUD GENERATION OF CONTENT TO BE STREAMED TO VR/AR PLATFORMS USING A VIRTUAL VIEW BROADCASTER

CROSS-REFERENCE TO RELATED APPLICATION

This application claims the benefit of U.S. Provisional Application Ser. No. 62/442,366, filed on Jan. 4, 2017, entitled "CLOUD GENERATION OF CONTENT TO BE STREAMED TO VR/AR PLATFORMS USING CLOUD SERVERS AND RENDERING OF STEREOSCOPIC 360-DEGREE PANORAMAS USING RAY MARCHING AND DEPTH INFORMATION," commonly assigned with this application and incorporated herein by reference in its entirety.

TECHNICAL FIELD

This application is directed, in general, to cloud-based rendering and, more specifically, to cloud-based rendering and streaming to multiple client platforms.

BACKGROUND

Many computer graphic images are created by mathematically modeling the interaction of light with a three-dimensional (3D) scene from a given viewpoint. This process, called "rendering," generates a two-dimensional (2D) image of the scene from the given viewpoint and is analogous to taking a photograph of a real-world scene.

As the demand for computer graphics, and in particular for real-time computer graphics, has increased, computer systems with graphics processing subsystems adapted to accelerate the rendering process have become widespread. In these computer systems, the rendering process is divided between a computer's general purpose central processing unit (CPU) and the graphics processing subsystem, architecturally centered about a graphics processing unit (GPU). Typically, the CPU performs high-level operations, such as determining the position, motion, and collision of objects in a given scene. From these high-level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data.

With the accelerated rendering provided by these computer systems, various computer applications, such as video games, use cloud-based rendering. Through this technology, users can enjoy a virtual graphics experience on their computing devices. This cloud-based platform also allows users to remotely compete against others in tournaments or sporting events over a communications network. In addition to those who are actively participating in a video game or another computer application, passive viewers who are watching but not playing or actively participating, at video game tournaments or other eSport events can view an ongoing game on their computing device through the viewpoint of one of the players.

BRIEF DESCRIPTION

Reference is now made to the following descriptions taken in conjunction with the accompanying drawings, in which:

FIG. 4 illustrates a diagram of an embodiment of a virtual view broadcasting system 400 in a video gaming environment.

SUMMARY

Figure 1:
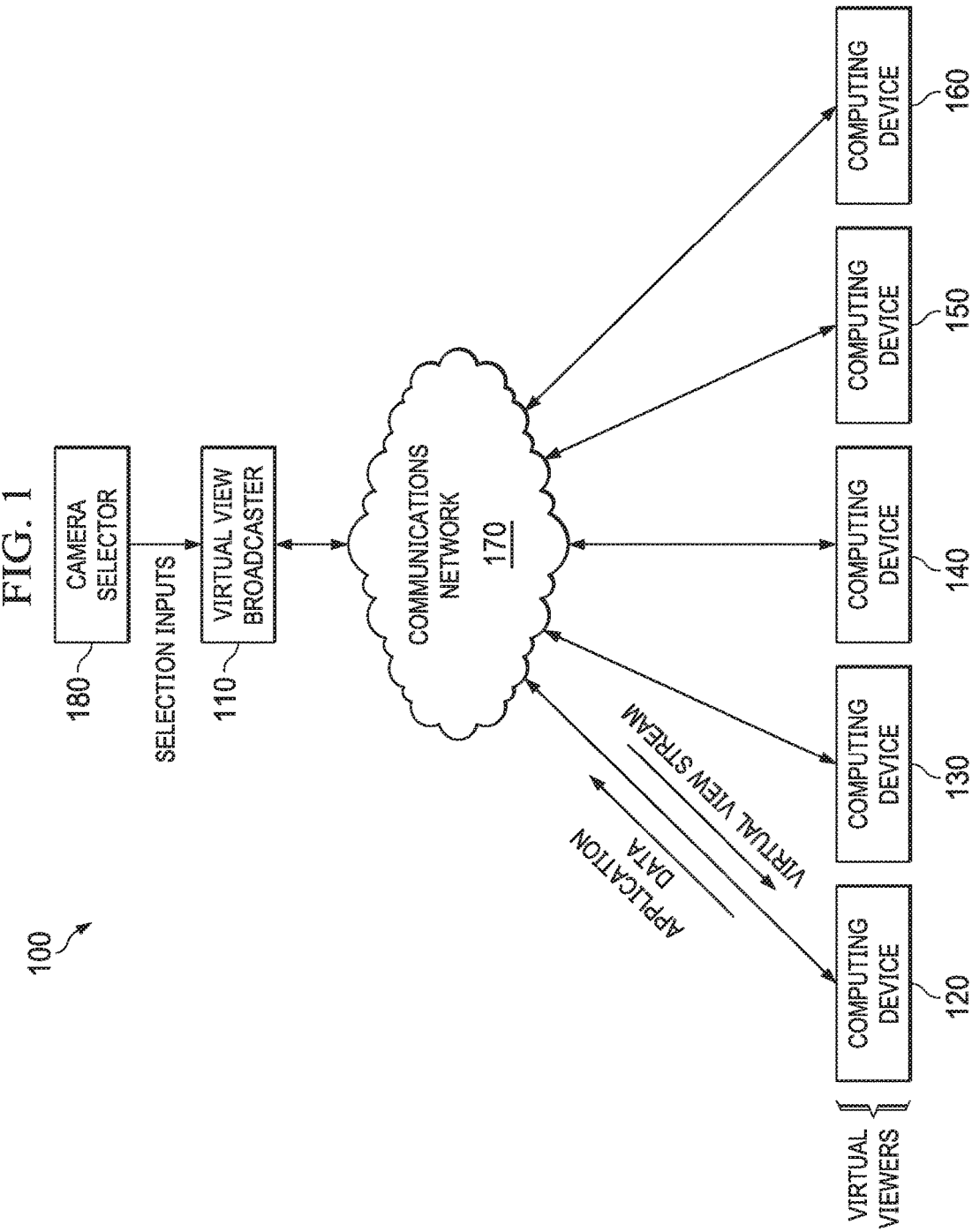
FIG. 1 illustrates a block diagram of an embodiment of a virtual view broadcasting system constructed according to the principles of the disclosure.

In one aspect, the disclosure provides a virtual view broadcaster. In one embodiment, the virtual view broadcaster includes: (1) a cloud-based renderer configured to generate virtual view images from a virtual camera positioned in a computer application, and (2) an image processor configured to generate a virtual view stream for the virtual camera employing the virtual view rendered images, wherein the virtual view images are from different viewing directions at the virtual camera.

In another aspect, the disclosure provides a virtual view broadcasting system for cloud-based video games. In one embodiment the virtual view broadcasting system includes: (1) a network server that generates a plurality of computer-based virtual view images from a virtual camera positioned within a computer application, (2) a stitching unit that joins the computer-based virtual view images to form a 360 degree view set of images, and (3) an encoder that encodes the 360 degree view set of images into a video stream for transmission to computing devices for viewing.

In still another aspect, the discloser provides a video gaming broadcaster for cloud-based video gaming with multiple active players. In one embodiment, the video gaming broadcaster includes: (1) a rendering engine configured to generate a set of virtual view images from active players playing a video game, and (2) an image processor configured to stitch each of the sets to form 360 degree virtual views corresponding to each of the active players and encode the stitched 360 degree virtual views into different video streams, wherein at least one of the different video streams is selected for transmission to computing devices for viewing based on a selection input.

DETAILED DESCRIPTION

Even though passive viewers can view an ongoing game on their own computing device, they are limited to the viewpoints of the various active players or participants. Accordingly, disclosed herein is a virtual view broadcaster having a renderer or rendering engine that generates virtual view images from the viewpoints of virtual cameras, sometimes referred to as viewports, located within a computer application, such as a video game program. Thus, instead of viewpoints from just the active players, the renderer provides virtual view images that are different from that of the active players. The renderer disclosed herein is a cloud-based renderer that can provide virtual view images that are used to generate 360 degrees of virtual views for each of the virtual cameras located in a computer application. Accordingly, the renderer can create a virtual reality experience from a computer application that is not a virtual reality application.

As noted above, the renderer creates the virtual view images from virtual cameras that are located within the computer application. If one considers a sporting event, such as football for example, there are typically multiple cameras operating at the same time, and any of the multiple cameras may be employed as action dictates to provide video content. Instead of video content from real life, the virtual cameras disclosed herein are positioned in a computer application and a renderer generates virtual view images from these virtual cameras. The renderer can generate virtual view images for various viewing directions at the virtual cameras. In some embodiments, the renderer generates virtual view images in a viewing direction that corresponds to the direction a virtual viewer is looking. The number of virtual cameras that may be positioned within a computer application can vary and may be determined based on the available computing horsepower. In some embodiments, the number N of active virtual cameras is based on the computing capacity of the renderer. The number of active virtual cameras may equal the available number of virtual cameras in a computer application or can be less depending on, for example, the computing power of the renderer or the preference of a user of the virtual view broadcaster.

As noted above, the disclosed renderer can provide 360 degrees of virtual views for each of the virtual cameras. In one embodiment, the renderer provides the 360 degree virtual views for a virtual camera by rendering six virtual view images that form a cube at the camera location, i.e., a cube map. The cube map is then used for texturing of a scene of the computer application. Cube map texturing is a form of texture mapping that uses a 3D direction vector to index into a texture that is six square 2D textures arranged like the faces of a cube. Since rendering of cube maps is more complex than rendering regular views into 2D textures, GPU's are often employed with a CPU. For example, Nvidia Grid™ technology can be employed to provide the renderer and rendering schemes disclosed herein to support cube map rendering. Nvidia Grid™ is by Nvidia Corporation of Santa Clara, Calif., and provides a graphics virtualization platform that allows the power of Nvidia GPU technology to be used by virtual desktops and computer applications.

After the various virtual view images are rendered, post processing is performed that includes stitching the virtual view images together to provide a stream of images from the virtual cameras. An encoder then encodes the stream of images into a virtual view stream for viewing. The virtual view stream is a video that can provide 360 degrees of virtual views, referred to herein as a spherical virtual video, for a virtual camera. The virtual view stream can be provided in real time in mono or in stereo for a virtual reality experience. The virtual view stream can be transmitted to computing devices of virtual viewers from the virtual view broadcaster via a communications network, such as the Internet.

In one embodiment, the renderer is implemented on a server or multiple servers that receive application data corresponding to at least one of the various virtual cameras positioned in the application, generate virtual view images, for at least one of the virtual cameras, and then stitch together virtual view images for the virtual camera to create a stream of images. The stream of images are then encoded into a virtual view stream and streamed in real time (or essentially real time) to the virtual viewer computing devices. Real time is a level of responsiveness sensed by the virtual viewer as sufficiently immediate or that enables a processor to keep up with processing of an inputs. In some embodiments, input data can be processed within milliseconds so that it is available virtually immediately as feedback. A cloud server or platform, such as an Nvidia Grid™ system, can be used to generate the virtual view stream.

The renderer can receive the application data from a computing device of a virtual viewer. The application data includes scene data that is sufficient for the renderer to generate the virtual view images. The application data can include directional information. For example, the computing device can send directional information to the renderer and the renderer can employ the directional information to generate the virtual view images of the virtual camera corresponding to the directional information. In these embodiments, the resulting virtual view stream sent to the computing device corresponds to the directional information. As such, the virtual view stream is not a spherical virtual video.

Virtual viewers, such as a passive viewer of a video game, can choose the different camera locations positioned within a computer application themselves or a designated camera selector, such as a broadcaster or a commentator of a video game tournament, could select the different camera locations. Additionally, a curator or a real time editor, may select a best camera location as often seen on live television. In some embodiments, a virtual viewer may be able to bounce around between various virtual cameras by selecting different camera locations.

Regardless of who selects a virtual camera or how the different virtual cameras are selected, the virtual view from a particular virtual camera that is viewed by a virtual viewer is determined by the directional information associated with a virtual viewer. The directional information can be generated from the computing device of the virtual viewer based on the movement of a joystick, directional keys of a keyboard, movement of a virtual reality headgear, such as a head mounted display (HMD), or a similar user interface.

In addition to static virtual cameras, mobile virtual cameras can also be used such as seen in current first person style shooter games. With the mobile virtual cameras, virtual viewers can move the virtual cameras within a computer application but cannot interact with the computer application. Considering a video game as an example of a computer application, a virtual camera may be positioned right behind a player to provide a third person view of "an over the head or shoulder" perspective allowing a virtual reality (VR) spectator to follow a player right over the shoulder. Thus, the locations of the virtual cameras do not have to be static but can be fluid and thus provide another benefit for virtual viewers.

The disclosed virtual view broadcaster may be employed in a broad spectrum of applications. Although VR gaming is one computer application of this broadcasting tool, the virtual view broadcaster may be applied to other applications, such as eSports applications as well as computer aided design (CAD) applications. For example, multiple virtual cameras can be employed in a CAD application, such as a building layout, that allows multiple viewers to look at different virtual views of the building layout based on selected virtual cameras and a the viewer's direction of viewing.

Turning now to the Figures, FIG. 1 illustrates a block diagram of an embodiment of a virtual view broadcasting system 100 constructed according to the principles of the disclosure. The virtual view broadcasting system 100 includes a virtual view broadcaster 110, computing devices 120, 130, 140, 150, 160, a communications network 170, and a camera selector 180. The computing devices 120, 130, 140, 150, 160, are collectively referred to as computing devices 120-160, and are communicatively coupled to the virtual view broadcaster 110 via the communications network 170. The communications network 170 can be a conventional network, such as the Internet, that allows connected computing devices to communicate with each other.

The virtual view broadcaster 110 is configured to generate a virtual view stream from one or more virtual cameras positioned in an application based on application data. The application data or at least some of the application data can be from virtual viewers (or the computing devices 120-160 thereof). In one embodiment, game publishers or other application developers can be provided with designated code for them to incorporate in their game or application to install virtual cameras therein. The designated code can correspond with a renderer of the virtual view broadcaster 110 to provide the virtual views when a particular virtual camera is selected.

The virtual view broadcaster 110 can be implemented on a server or on multiple servers of a cloud computing platform. The virtual view broadcaster 110 can include a CPU and multiple GPUs. In one embodiment, the virtual view broadcaster 110 includes a renderer, an image processor, and a video transmitter (not illustrated in FIG. 1). The renderer generates virtual view images from various virtual cameras positioned in the application. In one embodiment the virtual view images correspond to six sides of a cube map for a virtual camera location. The renderer can generate other virtual view images that can be combined to provide a virtual view of 360 degrees for a virtual camera. In some embodiments, the virtual view images can be for equirectangular views at the virtual camera instead of cube maps. The virtual view images correspond to application data received from, for example, the computing devices 120-160 of the virtual viewers. The application data can include scene data. In some embodiments, the application data can include directional information that indicates a viewing direction a virtual viewer is looking towards, selecting, pointing at, etc.

The image processor receives the virtual view images generated by the renderer, stitches them together into a stream of images, and encodes them into a virtual view stream for transmission. The image processor can also provide additional functions such as reformatting and image processing. The encoded virtual view stream is then provided to the video transmitter and sent to the computing devices 120-160. The video transmitter can be a conventional device that receives encoded frames and transmits them as a video stream. As noted above, the video transmitter can be part of the virtual view broadcaster 110. In other embodiments, the video transmitter can be conventionally coupled to the virtual view broadcaster 110 and used for transmission of the virtual view stream. In some embodiments, the video transmitter is a video proxy server.

The virtual view stream provided to the different computing devices 120-160 can be from the same virtual camera and can be the same video stream. A virtual viewer can then determine their actual view based on the directional information provided through their respective computing devices 120-160. In some embodiments, virtual view streams from different virtual cameras can be simultaneously provided to different ones of the computing devices 120-160. A virtual viewer can then still determine their actual view based on the directional information provided through their respective computing devices 120-160. Additionally, the virtual view stream provided to the different computing devices 120-160 can be different based on directional information received at the virtual view broadcaster 110 from each of the computing devices 120-160. For example, the virtual view broadcaster 110 (i.e., the renderer thereof) can generate virtual view images based on directional information from computing device 120 and send a virtual view stream to the computing device 120 that corresponds to the directional information from the computing device 120. The virtual view broadcaster 110 can also generate virtual view images based on directional information from computing device 130 and send a virtual view stream to the computing device 130 that corresponds to the directional information from computing device 130. As such, the virtual view stream sent to both the computing device 120 and the computing device 130 can be different even though these streams are generated from the same virtual camera.

As noted above the virtual view stream provided to the different computing devices 120-160 can be from different virtual cameras. The virtual camera that is used can be determined by the camera selector 180 coupled to the virtual view broadcaster 110. The virtual view broadcaster 110 can receive a selection input from the camera selector 180 to determine the virtual camera to use. In some embodiments, multiple selection inputs can be received for different virtual cameras and the virtual view broadcaster 100 can simultaneously generate the virtual views for the multiple virtual cameras selected. The virtual view broadcaster 110 can also process the virtual views for all of the active virtual cameras of a computer application or for a designated number of the active virtual cameras. In some embodiments, the virtual viewers can then select which virtual view stream they would like to receive from the virtual view broadcaster 110. The camera selector 180 can be a designated person or a computing device thereof that is used to provide the selection input to the virtual view broadcaster 100. The computing device can be one of the computing devices 120-160.

The computing devices 120-160 can be VR headgear, smartphones, desk top computers, laptops, computing pad, tablet, etc. The computing devices 120-160 can be thin clients that communicate with the virtual view broadcaster 110 and provide sufficient application data thereto for rendering and stitching. Each of or at least some of the computing devices 120-160 can be different types of devices. For example, computing devices 120-140 can be VR headgears, computing device 150 can be a laptop, and computing device 160 can be an Nvidia SHIELD Tablet.

Figure 2:
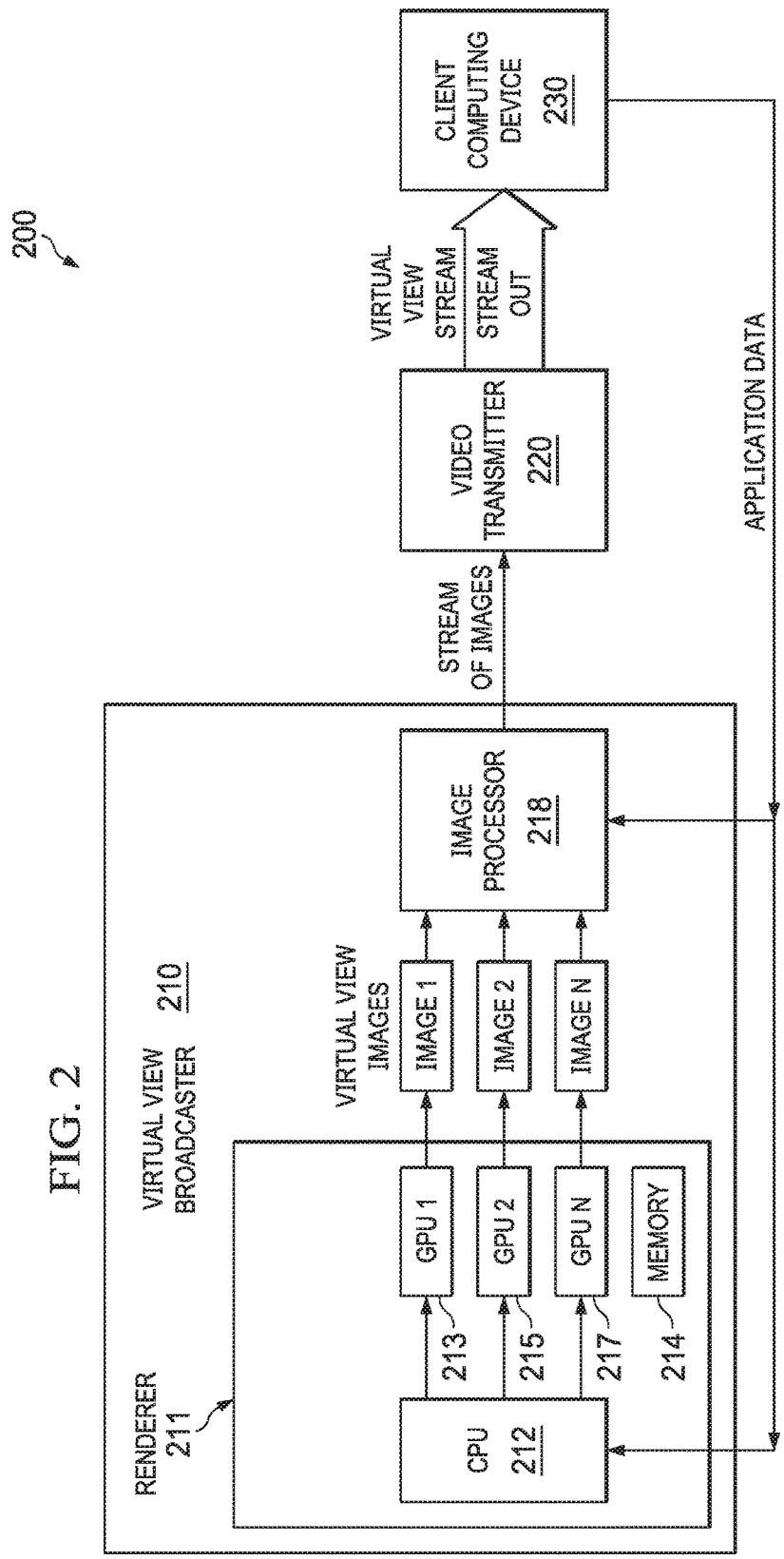
FIG. 2 illustrates a block diagram of an embodiment of a virtual view broadcasting system constructed according to the principles of the disclosure that illustrates the operational flow for providing a virtual view stream to a client computing device of a virtual viewer.

FIG. 2 illustrates a block diagram of an embodiment of a virtual view broadcasting system 200 constructed according to the principles of the disclosure that illustrates the operational flow for providing a virtual view stream to a client computing device of a virtual viewer. The virtual view broadcasting system 200 includes a virtual view broadcaster 210, a video transmitter 220, and a client computing device 230. In some embodiments, the virtual view broadcaster 110 of FIG. 1 is configured as and functions as the virtual view broadcaster 210.

The virtual view broadcaster 210 is configured to generate a virtual view stream for the client computing device 230 from one or more virtual cameras positioned in a computer application based on application data. In one embodiment, the virtual view broadcaster 210 is a cloud-based device, such as a cloud server (or servers), that generates content in the cloud to be streamed to the client computing device 230. The virtual view broadcaster 210 can be implemented on one or more network (e.g., cloud) servers to render content in a real time (or semi-real time) content engine and to create virtual view images that can be stitched together into a 360 degree video for streaming to virtual viewers in real-time or semi-real time. The virtual view broadcaster 210 includes a renderer 211 and an image processor 218. In some embodiments, the virtual view broadcaster 210 also includes the video transmitter 220.

The renderer 211 generates rendered data sets for applications or technology that require multiple representations generated in real-time, such as for a VR or AR display. For example, the data set can include between 6-21 images. The data sets can correspond to multiple views (e.g., cube views) for different virtual cameras. As such, the renderer 211 can draw six virtual view images for a given virtual camera. Using a game application as an example, the renderer 211 can generate the six virtual view images by calling the rendering function of a game engine six times.

The renderer 211 includes a central processing unit (CPU) 212 that is coupled to multiple graphics processing units (GPU) 213, 215, 217. The number of CPUs or GPUs can vary in different renderer embodiments. The GPUs can be configured to render entire, separate panorama views or every GPU can render one frame of the same view. In some embodiments, the virtual view broadcaster 210 can include multiple renderers or a single renderer having multiple CPUs that each paired with multiples GPUs. In FIG. 2, the number of GPUs can correspond to the number of virtual view images that are generated for a data set. Thus, for a cube map having six virtual view images, N in FIG. 2 is six. In some embodiments, the number of GPUs corresponds to the number of active virtual cameras in a computer application.

The renderer 211 includes a memory 214 that includes a series of operating instructions that direct the operation of the renderer 211. The series of operating instructions correspond to algorithms that direct the rendering processes disclosed herein. The memory 214 can be coupled to and cooperate with the CPU 212 and the GPUs 213, 215, 217, to render the virtual view images. The renderer 211 can also include or interact with other components, such as an application engine, coupled to the CPU 212, the memory 214, or the GPUs 213, 215, 217, that are used to generate the virtual view images. The application engine can be a software engine that includes the operating instructions that correspond to the algorithms employed to generate scenes, such as a game engine providing scenes from a video game.

The CPU 212 is configured to cooperate with the GPUs 213, 215, 217, to generate the data sets for the virtual cameras. The CPU 212 can send scene information to the GPUs 213, 215, 217, for additional processing to generate images or frames for a particular virtual viewpoint. For example, the CPU 212 can use application data from the client computing device 230 to determine scene information like vertex positions, triangle connectivity, textures, material properties, light sources, etc., and pass this information to the GPUs 213, 215, 217, to paint the pixels of the virtual view images. In some embodiments, the client computing device 230 can send action or movement information via the communications network 170 that will indirectly affect the vertex positions. Thus, the application data from the client computing device 230 can include only some of the scene data.

After rendering, the renderer 211 sends the generated virtual view images to the image processor 218. The image processor 218 is configured to stitch the virtual view images together to form a 360 degree virtual view for the virtual camera. The image processor 218 also performs compression, encoding to a video stream, reformatting and image processing on the virtual video images. The image processor 218 can include an encoder that encodes into standard protocol video streams, such as H.264, HVEC, etc. The image processor 218 then sends the encoded, 360 degree virtual view stream to the video transmitter 220 for streaming.

The video transmitter 220 receives the encoded video stream and transmits the virtual view stream to the client computing device 230. The video transmitter 220 can be a video proxy server. The client computing device 230 can be one of the computing devices 120-160 of FIG. 1.

The client computing device 230 displays a virtual view from a virtual camera employing the virtual video stream received from the video transmitter 220 and sends application data to the virtual view broadcaster 210 to be used for real time generation and processing of content. The application data can include directional information for determining views at a virtual camera. The client computing device 230 can also provide a selection input for selecting a particular virtual camera.

Figure 3:
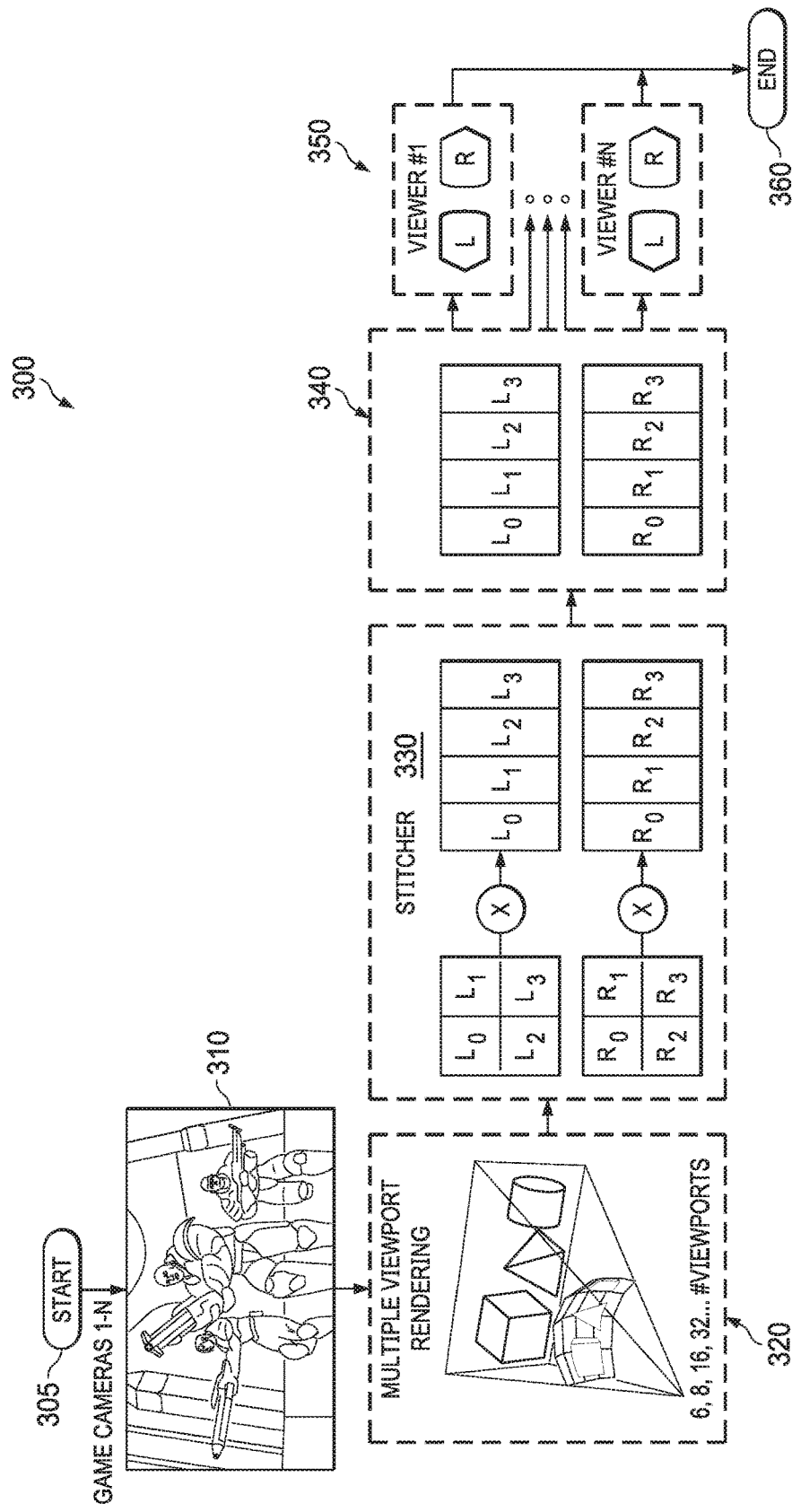
FIG. 3 illustrates a flow diagram of an embodiment of a method 300 of providing a virtual view stream carried out according to the principles of the disclosure.

FIG. 3 illustrates a flow diagram of an embodiment of a method 300 of providing a stream of virtual views carried out according to the principles of the disclosure. The method 300 depicts the operational flow of a virtual view broadcaster, such as the virtual view broadcaster 110 or 210 disclosed herein. In the method 300, a stream of virtual views is provided in stereo. In other embodiments, a stream of virtual views can be provided in mono. The method begins in step 305.

In a step 310, a selection for a virtual camera to use for rendering is received. The virtual camera positioned in a computer application, such as a game application. In some embodiments, multiple virtual cameras within the application can be selected for rendering. The selected virtual camera or cameras can be received by a virtual view broadcaster such as disclosed herein. The application may have 1 to N virtual cameras. A virtual viewer or another designated person may select the virtual camera or virtual cameras to use. When multiple virtual cameras are selected, simultaneously rendering and streaming can be performed by the virtual view broadcaster.

In a step 320, rendering of virtual view images is performed based on the selected virtual camera. As noted above, N virtual cameras are available for generating multiple virtual view image renderings. The number of virtual view images may vary, for example 6, 8, 16 or 32, as indicated in FIG. 3. In some embodiments, the number of virtual view images generated is sufficient to provide a 3D, panoramic stream of virtual views. In one embodiment, at least 6 views are rendered at 90 frames per second. For left and right views as illustrated in FIG. 3, a minimum of 12 frames per second can be rendered. In an embodiment streaming 360 degree rendered video, 30 frames per second can be rendered. The rendering can be sufficient to provide a virtual reality experience for virtual viewers having a VR headgear. In some embodiments, the renderer can employ directional information from application data to render the specific virtual view images.

After rendering, stitching the frames of virtual view images together is performed in a step 330. A stitcher or stitching unit can be used to stitch the rendered virtual view images together. A conventional stitcher can be used. Virtual view images can be received by the stitcher from the renderer. The stitcher may be part of an image processor, such as the image processor 218 of FIG. 2. The method 300 may render and stitch in real time. In some embodiments, the method 300 may employ a buffer of 0-30 seconds for creating the virtual views.

In FIG. 3, the illustrated virtual view images are for the left and right eyes for a single virtual camera. The multiple virtual view images can provide 360 degree viewing for the virtual camera in stereo. For example, there can be six virtual views corresponding to a cube map that can be stitched together for 360 degree viewing.

$L_0$ and $R_0$ are the first virtual view images from different viewpoints at a virtual camera for the left eye and right eye, respectively. Omni-directional stereo (ODS) projection can be used for generating left and right viewpoints. $L_1$-$L_3$ and $R_1$-$R_3$ represent additional virtual view images for the left and right eyes. The stitcher stitches together the virtual view images for the left and right eyes to provide a stream of images. In one embodiment, the stitcher employs the virtual view images to create equirectangular panoramas.

In a step 340, the stitched virtual views are encoded into a 360 degree virtual view stream. In FIG. 3, a virtual view stream is encoded for the left eye and another virtual view stream is encoded for the right eye. An encoder can receive the stream of images from the stitcher and perform the encoding. The stitched virtual view images can be encoded into standard protocol video streams, such as H.264, HVEC, etc. The stitched virtual views can be stitched panoramas. In some embodiments, each encoded virtual view stream corresponds to the same virtual camera.

In a step 350, the encoded virtual view streams are transmitted for viewing by n separate virtual viewers. As illustrated, the stream of virtual views can be provided in left and right views. The virtual viewers can determine their actual virtual view to view from a received virtual video stream by their viewing direction. This can be from directional information. In some embodiments, the virtual viewers can also select the virtual view stream to view via a selection input. This can be provided to the virtual video broadcaster and affect the virtual view stream that is received or can be employed at the computing device to select one of multiple virtual view streams that are received. The type of computing devices that are used by the virtual viewers can vary. In a step 360, the method 300 ends.

FIG. 4 illustrates a diagram of an embodiment of a virtual view broadcasting system 400 in a video gaming environment that provides a cloud-based, video gaming broadcast system. In this embodiment, active players 405 are playing a video game and a commentator 410 selects the virtual cameras for passive virtual viewers 420 to experience virtual reality spectating of the active players 405 playing the video game. A virtual view broadcaster 430 including a real-time rendering engine 435 is used to render virtual views. For example, the virtual view broadcaster of FIG. 1 or FIG. 2 can be employed. The virtual view broadcaster 430, illustrated as a cloud-based server in FIG. 4, receives selection inputs from the commentator 410 to determine the virtual cameras to use for generating virtual view streams 440 to provide to the virtual viewers 420 via a video transmitter 439. The selection inputs can be received via a communications interface 437 configured to transmit and receive signals or data. The communication interface 437 and the video transmitter can be conventional components. In FIG. 4, the virtual view streams provided to the virtual viewers 420 are 360 degree video streams.

The virtual view broadcaster 430 including the rendering engine 435 can be implemented on one or more network (e.g., cloud) servers to render content in real time (or semi-real time) and to create virtual view images that can be stitched together into a 360 degree video for streaming to the virtual viewers 420 in real-time or semi-real time.

In one example, the virtual view broadcaster 430 is a cloud server having one or more CPUs and multiple GPUs coupled to adequate memory along with a real-time game engine, wherein the virtual view broadcaster 430 generates a whole world rendering into a render target typically having 6, 8, 16 or 32 virtual view images at one time. At 32 views, 32 virtual view images for every regular frame are generated.

The virtual view broadcaster 430 can stitch together each of these virtual view images to provide a panorama of computer-generated frames. The 360 degree virtual viewing process creates views all around virtual viewers 420 (e.g., above, below, to the right and to the left), which are stitched together to make an overall giant panoramic view. The virtual view broadcaster 430 can require a large amount of server processing power since these virtual views are created multiple times (e.g., 60, 90 or 120 times per second) to provide smooth interactive video to the virtual viewers 420.

Separate, individual servers may also be employed to generate these multiple virtual view images. An encoder is used to create a video from the virtual view images that is streamed out to the virtual viewers 420 via the video transmitter 439. An image processor 438 can perform the stitching and the encoding. The image processor 438 can be, for example, the image processor 218. The created video stream can be transmitted (e.g., via the Internet) to the virtual viewers 420 for viewing on their computing device. At least one client computing device used for viewing may be a VR HMD (head mounted display) headset. In FIG. 4, each virtual viewer has a VR HMD. With the video streams, the virtual viewers 420 can experience a 360 degree virtual reality.

The virtual viewers 420 can watch the active players 405 playing the video game, like spectators watching a sporting event. In some embodiments, the rendering engine 435 generates virtual views based on the application data received from the active players 405. Thus, a virtual viewer 420 can receive the same view as a player. In some embodiments, the commentator 410 can select a virtual camera to use for the virtual view streams 440. Accordingly, the commentator 410 can select one of the active players 405 to stream. Besides views of the active players 405, the commentator 410 or the virtual viewers 420 can select other views. For example, a virtual viewer 420 can select a virtual camera to obtain a different view than watching a player or a view of a player. Within a single game, multiple virtual cameras can be selected via selection inputs. As such, the virtual view broadcaster 430 can create and stitch virtual view images together to form a virtual view stream from different virtual cameras during a game.

Employing the VR HMD, each of the virtual viewers 420 can determine their virtual view from the virtual view stream 440 they receive by pointing or turning their heads. This positioning can be in the center of a sphere watching the virtual view stream. In some embodiments, the virtual views are generated based on other directional information that can depend on the type of computing device.

In some embodiments, a virtual viewer 420 can move around within the video game via a mobile virtual camera to create their own VR experience. In some embodiments, movement by the virtual viewer 420 within the video game can be similar to moving closer to or farther from a television screen. The commentator 410 of a video director may also move the camera position, as noted.

Accordingly, the above-described system, apparatus, and methods or at least a portion thereof may be embodied in or performed by various processors, such as digital data processors or computers, wherein the computers are programmed or store executable programs of sequences of software instructions to perform one or more of the steps of the methods. The software instructions of such programs disclosed herein may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the methods described herein or components of the apparatuses described herein.

Certain embodiments disclosed herein can further relate to computer storage products with a non-transitory computer-readable medium that have program code thereon for performing various computer-implemented operations that embody the apparatuses, the systems or carry out the steps of the methods set forth herein. Non-transitory medium used herein refers to all computer-readable media except for transitory, propagating signals. Examples of non-transitory computer-readable medium include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

The disclosure provides a broadcasting system, including a network server that generates a plurality of computer-based viewing images corresponding to, for example, a set of 360 degree viewing environments for concurrent active and spectator participants, a stitching unit that joins the computer-based images to form the set of 360 degree viewing environments for the concurrent active and spectator participants, and an encoder that encodes the 360 degree viewing environments into a video stream for transmission to viewing devices of the concurrent active and spectator participants. The 360 degree viewing environments can correspond to a camera direction that provides a viewport for the viewing devices. The total number of viewports determines a multiple of each computer-based image required. In some embodiments, generation of the plurality of computer-based images corresponds to a viewing device frame rate ranging from 60 to 240 frames per second. Generation of the plurality of computer-based images can include virtual reality renderings for the 360 degree viewing environments. Generation of the plurality of computer-based images can include selection of stored images for the 360 degree viewing environments. In some embodiments, a generation rate of each of the plurality of computer-based images is equal to a sum of frame rates required for each viewport. The viewports can be generated based on the spectator participants.

The broadcasting system can also be used to generate a light field. In such embodiments, a cloud based renderer draws an array of N virtual view images needed to generate a light field from a given view position. The view position corresponds to a position (virtual camera) and client (virtual viewer or computing device thereof). The image processor can then compress the virtual view images as needed based on inputs received from the computing device. The computing device can then receive the transmitted light field and display based on directional information and viewpoint.

What is claimed is:

1. A virtual view broadcaster, comprising:
    a cloud-based renderer configured to generate virtual view images from a virtual camera positioned in a computer application, wherein the cloud-based renderer includes multiple Graphics Processing Units (GPUs); and
    an image processor configured to generate a virtual view stream for the virtual camera employing the virtual view rendered images, wherein the virtual view images are from different viewing directions at the virtual camera and each of the GPUs of the cloud-based renderer is used to generate virtual view images for one of the different viewing directions.

2. The virtual view broadcaster as recited in claim 1 wherein the image processor includes a stitcher configured to join the virtual view images from each of the different viewing directions to generate a stream of images for the virtual camera.

3. The virtual view broadcaster as recited in claim 2 wherein the image processor includes an encoder configured to encode the stream of images to generate the virtual view stream for the virtual camera.

4. The virtual view broadcaster as recited in claim 1 wherein the virtual view stream is a spherical virtual video.

5. The virtual view broadcaster as recited in claim 4 wherein the spherical virtual video is a stereo video.

6. The virtual view broadcaster as recited in claim 1 wherein the computer application includes multiple virtual cameras and the virtual camera is selected from the multiple virtual cameras based on a selection input.

7. The virtual view broadcaster as recited in claim 6 wherein the virtual view broadcaster receives the selection input from a virtual view broadcaster.

8. The virtual view broadcaster as recited in claim 1 wherein the cloud-based renderer employs application data to generate the virtual view images.

9. The virtual view broadcaster as recited in claim 8 wherein the computer application is a cloud-based video game and the application data is from active players of the cloud-based video game.

10. The virtual view broadcaster as recited in claim 8 wherein the application data is from a client computing device running the computer application.

11. The virtual view broadcaster as recited in claim 1 further comprising a video transmitter configured to transmit the virtual view stream to a computing device of a virtual viewer.

12. The virtual view broadcaster as recited in claim 11 wherein the video transmitter is configured to transmit the virtual view stream to multiple computing devices.

13. The virtual view broadcaster as recited in claim 1 wherein the virtual view broadcaster generates multiple virtual view streams from a plurality of virtual cameras positioned in the computer application.

14. The virtual view broadcaster as recited in claim 1 wherein the virtual camera is a mobile virtual camera.

15. The virtual view broadcaster as recited in claim 1 wherein the computer application is a cloud-based video game.

16. A virtual view broadcasting system for cloud-based video games, comprising:
- a network server that generates a plurality of computer-based virtual view images from a virtual camera positioned within a computer application, wherein the network server includes multiple Graphics Processing Units (GPUs);
- a stitching unit that joins the computer-based virtual view images to form a 360 degree view set of images for the virtual camera, wherein each of the GPUs is used to generate computer-based virtual view images corresponding to different camera directions of the virtual camera; and
- an encoder that encodes the 360 degree view set of images into a video stream for transmission to computing devices for viewing.

17. The virtual view broadcasting system as recited in claim 16 wherein each of the computer-based virtual view images corresponds to one of the different camera directions of the virtual camera.

18. The virtual view broadcasting system as recited in claim 16 wherein the computer application is a cloud-based video game and the computing devices are computing devices of virtual viewers.

19. A video gaming broadcaster for cloud-based video gaming with multiple active players, comprising:
- a rendering engine configured to generate a set of virtual view images from different viewing directions of active players playing a video game, wherein the rendering engine includes multiple Graphics Processing Units (GPUs) and each of the GPUs is used to generate virtual view images for one of the different viewing directions; and
- an image processor configured to stitch each of the sets to form 360 degree virtual views corresponding to each of the active players and encode the stitched 360 degree virtual views into different video streams, wherein at least one of the different video streams is selected for transmission to computing devices for viewing based on a selection input.

* * * * *